United States Patent [19]
Miyao et al.

[11] Patent Number: 5,532,826
[45] Date of Patent: Jul. 2, 1996

[54] FACSIMILE APPARATUS

[75] Inventors: Masumasa Miyao, Fujisawa; Yuji Kawano; Masaki Sato, both of Yokohama, all of Japan

[73] Assignee: Hitachi, Ltd., Tokyo, Japan

[21] Appl. No.: 199,027

[22] Filed: Feb. 18, 1994

[30] Foreign Application Priority Data

Feb. 24, 1993 [JP] Japan ................................ 5-035686

[51] Int. Cl.⁶ ............................ H04N 1/21; G03G 15/00
[52] U.S. Cl. ........................ 358/296; 355/200; 347/245; 347/262
[58] Field of Search ........................ 358/296; 347/245, 347/263, 108, 3, 4, 104, 262, 263, 152; 346/145; 355/200, 200 A

[56] References Cited

U.S. PATENT DOCUMENTS

| | | | |
|---|---|---|---|
| 4,872,061 | 10/1989 | Uchiyama | 358/400 |
| 4,957,689 | 9/1990 | Ohnishi et al. | 358/296 |
| 5,297,018 | 3/1994 | Kashimura | 346/134 |
| 5,331,374 | 7/1994 | Abe et al. | 355/200 |
| 5,414,492 | 5/1995 | Kubota | 355/200 |

*Primary Examiner*—Peter S. Wong
*Assistant Examiner*—Gregory J. Toatley, Jr.
*Attorney, Agent, or Firm*—Antonelli, Terry, Stout & Kraus

[57] ABSTRACT

In order to reduce a space required to install a facsimile apparatus and to facilitate the change of recording sheet, a recording sheet discharge tray forms a part of a body of the apparatus so that outward projection of the discharge tray from the apparatus body is prevented. Since a document cover serves as a tray for receiving discharged document and a document sheet supply tray is disposed on it, the projection of the document sheet supply tray from the apparatus body can be prevented. Since the recording sheet cassette can be drawn out from a front side of the apparatus body, the operation of supplying or adding the cut sheets can be performed from the front side of the apparatus body, and therefore a user need not move to the side portion of the apparatus body. Since one line sensor of an image reading portion can read both a document placed on an image reading surface and a document from the document sheet supply tray, the structure of the apparatus can be simplified.

8 Claims, 6 Drawing Sheets

FACSIMILE APPARATUS

BACKGROUND OF THE INVENTION

The present invention relates to a facsimile apparatus capable of reading both sheet-shaped document and a book-shaped document and transmitting/receiving read signals of the read document.

A facsimile apparatus for transmitting image data of documents or drawings through a public line has been constituted as shown in FIG. 1 and another structure has been disclosed in Japanese Patent Application Laid-Open No. 4-83460.

The former structure is a thermosensible paper type of facsimile apparatus comprising a document paper discharge tray 6' on an apparatus body 1, the apparatus further including a document paper supply tray 7' and a recording paper discharge tray 3' disposed to project from two sides of the apparatus body 1' in the opposite directions to each other. When a document to be transmitted is set on the document paper supply tray 7', the document is introduced into the apparatus body 1' to be allowed to pass through an image reading means (not shown) disposed in the apparatus body 1' so that information of the document is read as image data, the read document being then discharged onto the document paper discharge tray 6'. When the facsimile apparatus receives information, the received information is recorded on a cut sheet placed in the apparatus body 1', and the cut sheet is discharged onto the recording paper discharge tray 3'.

The latter apparatus has a document reading surface on which a document to be transmitted is placed and a line sensor which moves along the document reading surface. The apparatus further comprises an image reading means for reading the document placed on the document reading surface and a document cover which is opened/closed around a pivot axis at a side thereof to uncover/cover the document reading surface. When the line sensor of the image reading means moves along the document reading surface, the image of a book-shaped (thick) document can be directly transmitted. Further, this apparatus comprises a recording paper cassette composed of a cassette body for holding cut sheets and a cassette cover, the cassette cover being arranged to also serve as a paper discharge tray. Therefore, the outward projection of the paper discharge tray from the apparatus body is prevented.

However, following points are not considered in the foregoing conventional apparatuses.

That is, the structure of the former apparatus comprising the document paper supply tray 7' and the recording paper discharge tray 3,' which project outwards from the apparatus body, causes the overall size of the apparatus to be enlarged excessively. Therefore, there arises a problem in that a wide area is required to install the apparatus. The latter apparatus arranged in such a manner that the document cover is opened/closed around the pivot axis at its one side and the cassette cover of the recording paper cassette also serves as the paper discharge tray can overcome the problem of the outward projection of the paper discharge tray. However, the arrangement of the paper discharge tray on the right side of the apparatus body arises a necessity that the change of the cut sheets is performed from the right side of the apparatus body. Further, paper jamming having occurred during the paper conveyance must be treated by removing the jammed paper from the left side of the apparatus. Therefore, there arises a problem in that some of operations required to use the apparatus, such as supply and change of consumables and recovery of paper jamming, cannot be performed from the front side of the apparatus body.

SUMMARY OF THE INVENTION

The present invention is directed to overcome the foregoing problems of the conventional apparatuses at least partly, and accordingly an object of the present invention is to provide a facsimile apparatus capable of reducing the space required to install the apparatus.

Another object of the present invention is to provide a facsimile apparatus which enables supply or addition of recording paper into a cassette to be performed easily while eliminating a necessity for an operator to move here and there around the apparatus therefor.

Another object of the present invention is to provide a facsimile apparatus enabling all operations required to operate the apparatus to be performed from one side of the apparatus body and resulting in ease and convenience operation and management.

A facsimile apparatus according to an aspect of the present invention comprises an apparatus body having an operation control panel in a front side thereof, wherein the facsimile apparatus includes a recording paper cassette in the apparatus body accomodating therein cut sheets and being capable of being drawn out from the front side of the apparatus body, an image recording portion positioned above the recording paper cassette and adapted to record a received image on the cut sheet, a recording paper discharge tray forming a part of the apparatus body at one side of the apparatus body and adapted to receive thereon the recorded cut sheets, an image reading portion mounted to an upper portion of the apparatus body adapted to the image of a document to be transmitted, a document supply tray on the image reading portion capable of recieving thereon a stack of the document sheets, a document U-turn conveyance mechanism for sequentially receiving the document to convey the document, and a document cover above which the document paper supply tray is placed, on which the document conveyed by the document U-turn conveyance mechanism is placed and which also serves as a document discharge tray for pressing a thick document placed on the image reading surface, and wherein the image reading portion has a line sensor which is moved to a position below the document U-turn conveyance mechanism to read the document from the tray at the position when the document from the document paper supply tray is read to be transmitted, and which is moved along the document reading surface to read the thick document when the thick document placed on the document reading surface is read to be transmitted.

Moreover, the facsimile apparatus according to a preferred embodiment of the present invention is arranged in such a manner that the image reading portion is pivotally mounted with respect to the apparatus body through a hinge at a side end different from the front side, the image recording portion is pivotally mounted through a hinge to an end of a side of the apparatus body opposite to the one side for the recording paper discharge tray, the document cover pivotally mounted with respect to the image reading portion through a hinge at an end side of the apparatus body different from the front side, and the document paper supply tray is pivotally mounted with respect to the document cover through a hinge at an end side different from the front side of the apparatus body.

Since the facsimile apparatus according to an aspect of the present invention is, as described above, arranged in such a manner that the document paper supply tray, the document U-turn conveyance mechanism and the document cover are disposed on the image reading portion mounted on the upper portion of the apparatus body and that the recording paper discharge tray constitutes a part of the apparatus body, outward projection thereof from the apparatus body can be prevented. Since the document paper supply tray is mounted above the document cover, the projection of the document paper supply tray from the apparatus body can be prevented. Since the recording paper cassette is incorporated in the apparatus body to be drawn out from the front side of the apparatus body, the supply or addition of the cut sheets serving as the recording paper can be performed from the front side of the apparatus while eliminating a necessity for an operator to move here and there around the apparatus. Since the image reading portion has a line sensor which is moved to a position below the document U-turn conveyance mechanism to read the document from the tray at the position when the document from the document paper supply tray is read to be transmitted, and which is moved along the document reading surface to read a thick document on the reading surface when the thick document placed on the document reading surface is read to be transmitted, one image reading portion can read both thin document and thick document. Therefore, the structure of the image reading portion can be simplified.

Since the facsimile apparatus according to the preferred embodiment of the present invention is arranged in such a manner that the image reading portion is pivotally mounted with respect to the apparatus body through a hinge at an end side different from the front side and that the image recording portion is pivotally mounted through a hinge with respect to an end of a side of the apparatus body opposite the recording paper discharge tray, if paper jamming takes place during the conveyance of the cut sheet, all the user has to do is to rotate and hold the image reading portion, and then to move the image recording portion to the side of the apparatus body opposite the recording paper discharge tray, so that the cut sheet encountered jamming can be removed. In addition, supply or addition and change of consumables for the image reading portion can be performed similarly. Further, by pivotally displacing to raise the document paper supply tray, the transmitted document can be taken out from the upper face of the document cover. Therefore, setting of the document to be transmitted and taking-out of the transmitted document can be performed from the front side of the apparatus. If a thick document, such as a book, is read to be transmitted, the document cover is raised, the document is placed on the document reading surface and the document cover is used to press the thick document so that the image of the document is read to be transmitted. Since the document cover is mounted to the apparatus body through a hinge at a side end different from the front side, the operation of raising the document cover can be performed from the front side of the apparatus.

As a result, the facsimile apparatus according to the preferred embodiment of the present invention enables the user to perform all operations required to recover from paper jamming, and to supply or add and change consumables such as toner and recording paper from the front side of the apparatus body as well as the operations required for the facsimile transmission and reception. Therefore, the necessity for the user to move here and there around the apparatus can be eliminated.

Foregoing and other objects, features as well as advantages of the invention will be made clearer from the description of preferred embodiments hereafter referring to the drawings.

DESCRIPTION OF THE PREFERRED EMBODIMENT

Figure 7:
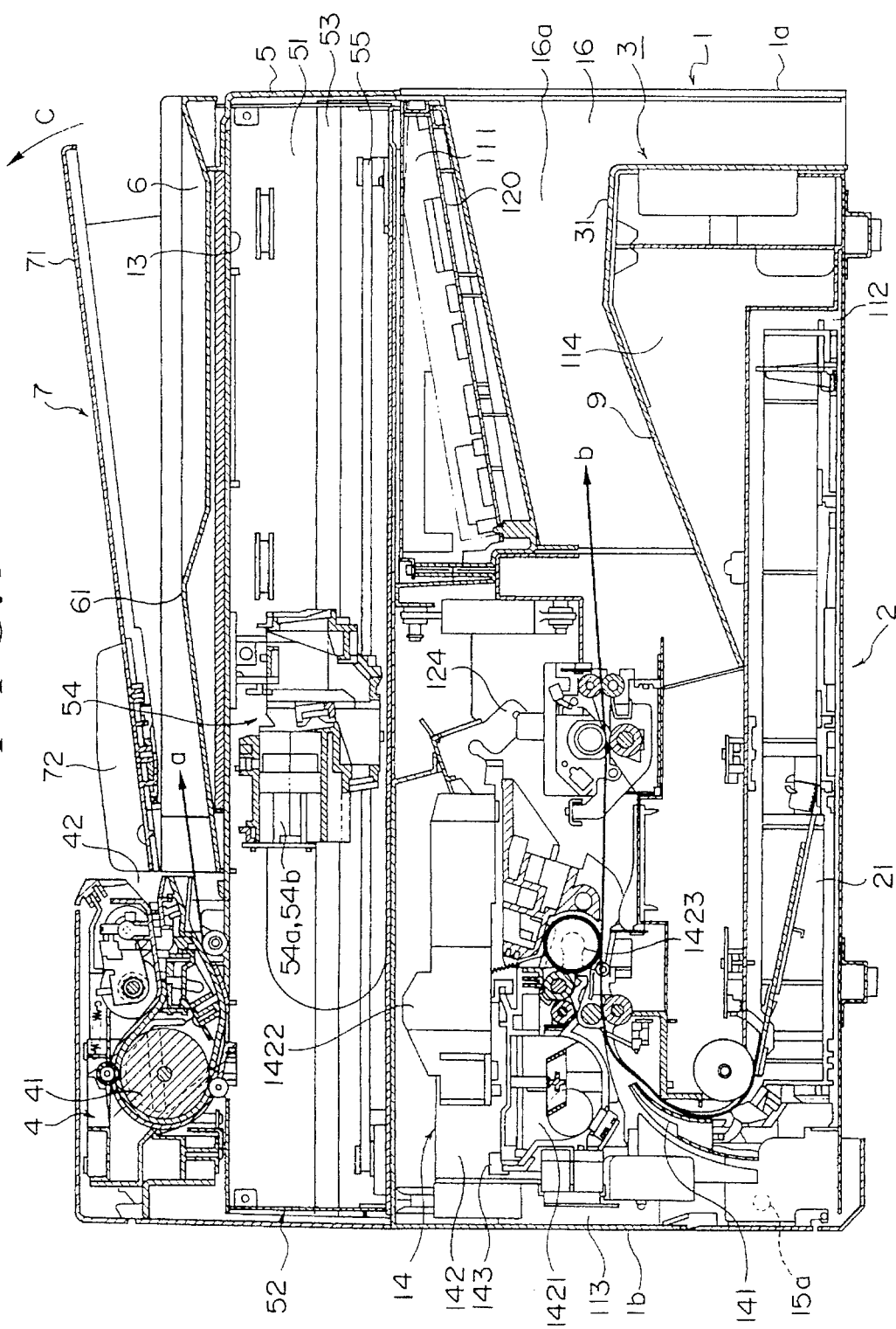
FIG. 7 is a sectional view which illustrates an main portion of an internal structure of the facsimile apparatus according to the embodiment of the present invention.
Figure 8:
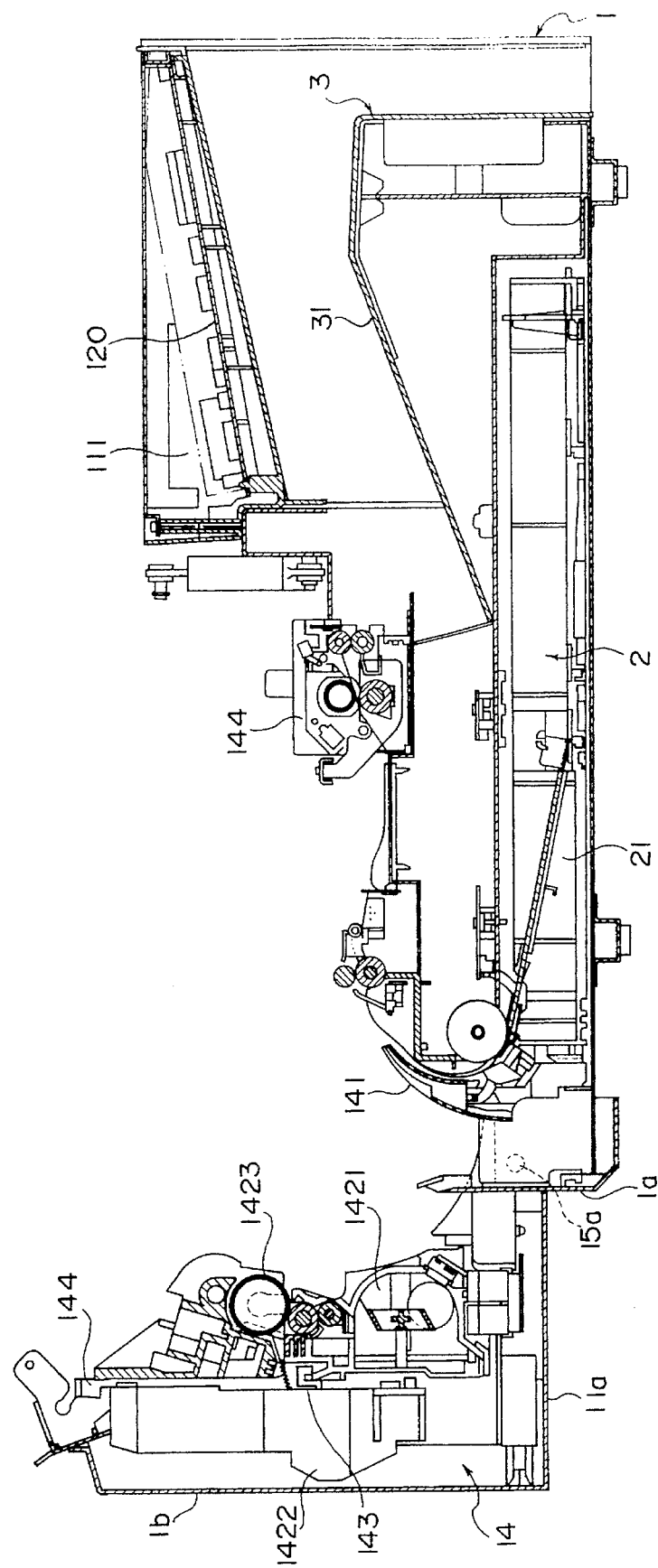
FIG. 8 is a sectional view which illustrates an main portion of an image recording portion, a recording paper cassette portion and a recording paper discharge tray portion.

An embodiment of a facsimile apparatus according to the present invention will now be described with reference to FIGS. 2 to 8. Referring to the drawings, reference numeral 1 represents a facsimile apparatus body. A box-like case 1a of the apparatus body 1, as shown in FIG. 7, comprises an accommodating portion 111 for accommodating a circuit board 120, on which circuit elements required to perform well-known facsimile transmission and reception are mounted, an accommodating portion 112 for accommodating a recording paper-accommodating cassette device 2 including a recording paper cassette 21 which accommodates therein recording cut sheets, an accommodating portion 113 for accommodating an image recording device 14 and an accommodating portion 114 for accommodating a discharged recording paper receiving device 3 including a recording paper discharge tray 31. Further, at an accommodation opening portion of the image recording device-accommodating portion 113 of the apparatus body 1, as shown in FIG. 8, the apparatus has a case cover 1b forming a part of the case of the apparatus body 1, the case cover 1b being pivotally mounted to the apparatus body 1 at, for example, a hinge 15a to be opened to the left (counterclockwise). A predetermined space 16 is formed above the recording paper discharge tray 31 of the accommodating portion 114 for the discharged recording paper receiving device 3 of the apparatus body 1. A operation control portion 8 for instructing respective operations of the facsimile apparatus, that is, the transmitting and receiving operations and the like is provided at a near (front) and side of a top face of the apparatus body 1. Further, a display portion 17 for confirming a state of each function of the facsimile apparatus is disposed to be visible from the front portion or front side.

The recording paper cassette 21, of a structure which can be drawn toward an operator (in the forward direction) from the front side of the apparatus body, is disposed and assembled in a lower portion of a central portion of the apparatus body 1. Therefore, supply or addition of the cut sheets can be performed by simply drawing out the cassette 21 toward the operator. The image recording device 14 is disposed at the left of the upper portion (FIG. 7) of the recording paper cassette 21 of the apparatus body 1. The image recording device 14 comprises a U-turn conveyance mechanism 141 for upwards conveying, in a U-turn manner, the recording paper (the cut sheet) 18 supplied from the cassette 21, that is, along a recording paper passage designated by an arrow b, and an image recording portion 142 for recording a facsimile signal (the received image) received by a receiving circuit (omitted from illustration) of the circuit board 120 of the facsimile apparatus on the recording paper which has been turned in the U-turn manner by the U-turn conveyance mechanism 141. The image recording device 14 is mounted through a chassis 143, onto an inside of the case cover 1b forming a part of the apparatus body 1 so as to be opened in a direction designated by an arrow A (toward left when viewed in FIG. 5). That is, the image recording device 14 is constituted in such a manner that the image recording device 14 is, together with its chassis, allowed to be exposed to an outside of the apparatus body 1 when the case cover 1b is opened left. The image recording device 14 is mounted on a rail 143 mounted to the chassis 143 so that the image recording device 14 can be drawn out toward the operator (the forward portion) as shown by an arrow E in FIG. 5 after it has been exposed to the outside. The image recording portion 142 comprises a development unit 1421 accommodating therein a developing toner, a laser unit 1422 for emitting laser beams for drawing an image to be recorded, and a cleaning unit 1423. Reference numeral 1424 represents a thermal fixing unit.

The discharged recording paper-receiving device 3 is disposed at a right position (when viewed in FIGS. 7 and 8) above the recording cassette 21, the discharged recording paper-receiving device 3 forming a part of the case of the apparatus body 1. In addition, the discharged recording paper-receiving device 3 has a space 16 capable of receiving therein a plurality of the recording papers or sheets on the recording paper discharge tray 31. The structure is arranged in such a manner that the recording paper discharged on the recording paper discharge tray 31 of the discharged recording paper-receiving device 3 is taken out through an opening portion 16a formed in a side portion (in the right side portion in FIGS. 7 and 8) of the apparatus body 1.

Figure 4:
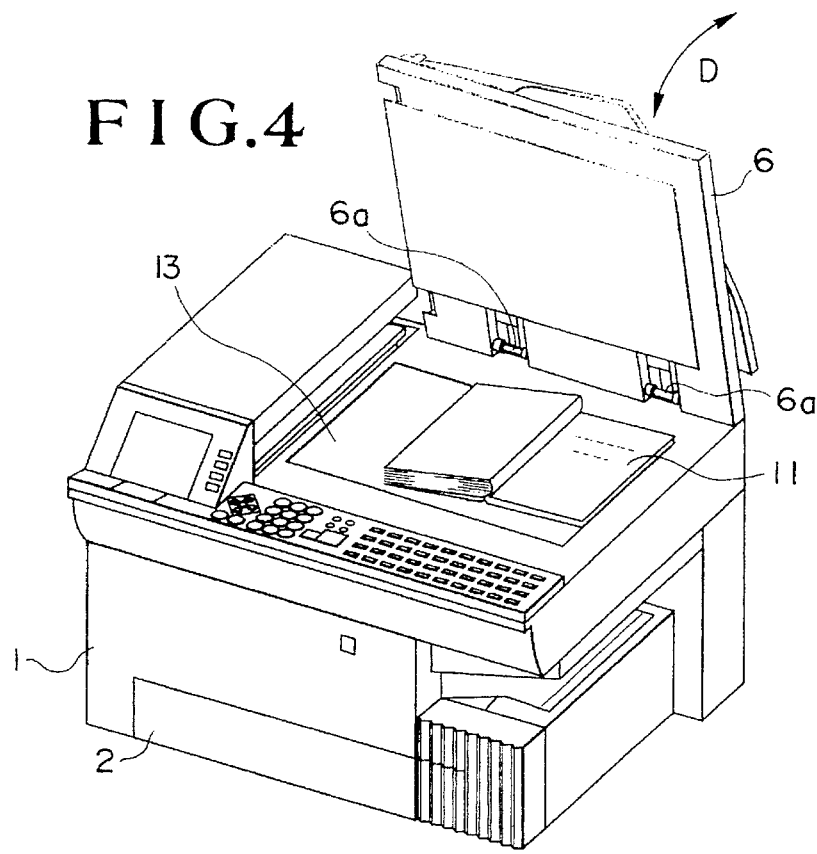
FIG. 4 is a perspective view which illustrates an appearance of the apparatus of FIG. 2 in a state where a document cover is opened.
Figure 5:
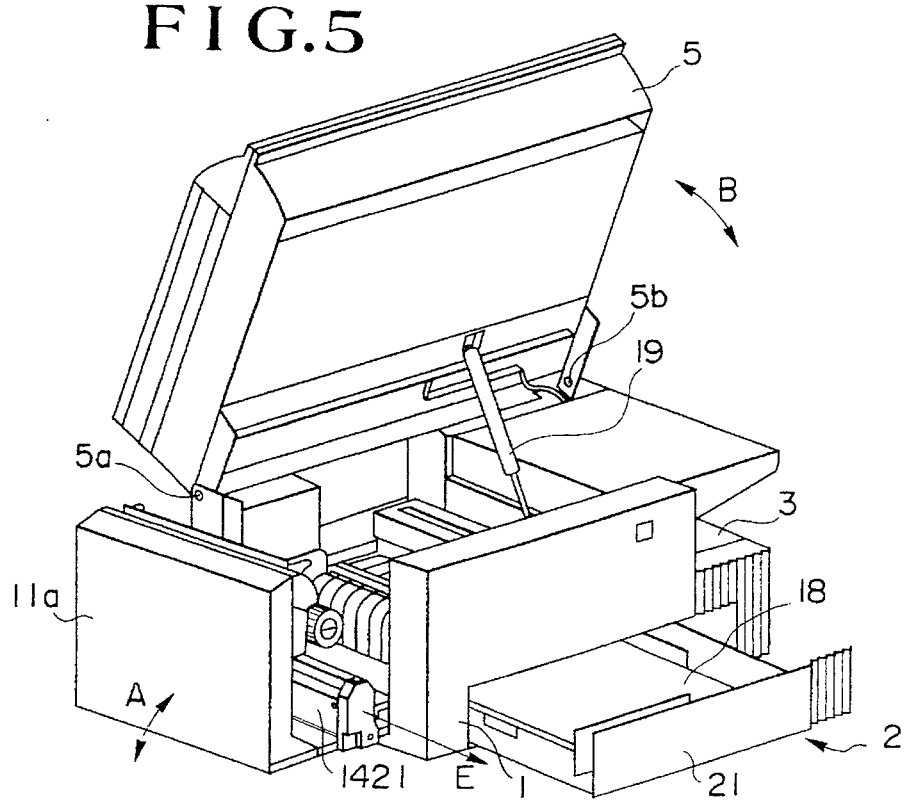
FIG. 5 is a perspective view which illustrates an appearance of the apparatus of FIG. 2 in a state where a reading portion and a recording portion are opened and a recording paper cassette is drawn out.
Figure 6:
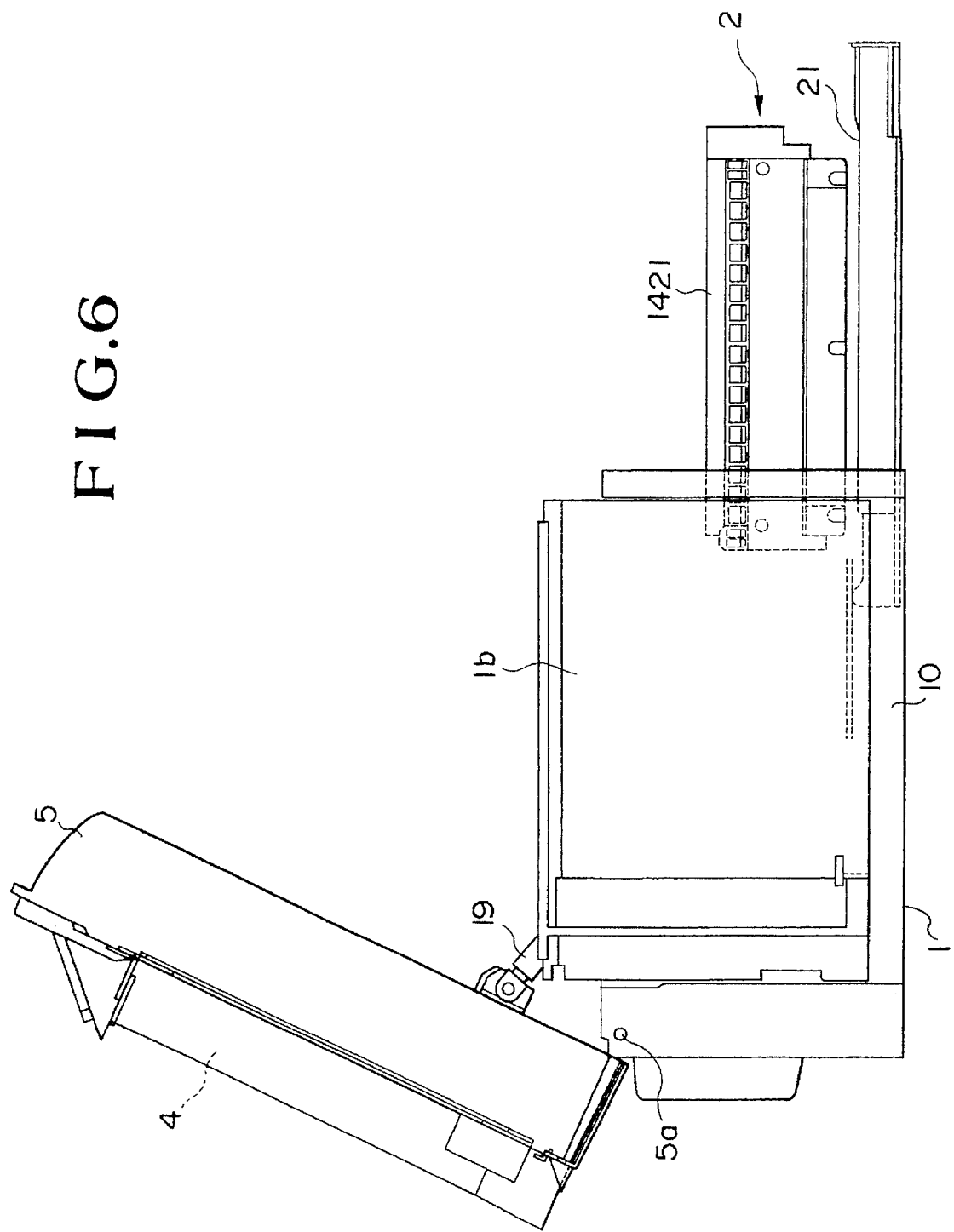
FIG. 6 is a side view which illustrates the apparents of FIG. 2 in a state where a cover for the apparatus body is opened.

Reference numeral 5 represents a box-like cover disposed on the upper surface of the apparatus body 1 and pivotally mounted to a rear end of the apparatus body 1 through a hinge 5a to be opened/closed generally vertically (in a direction designated by an arrow B in FIG. 5). The cover 5 for the apparatus body 1 has, on a part of an upper surface thereof, a document reading surface (a glass member) 13 for reading a document such as a sheet-shape document 12 (FIG. 3) and a book-shape document 11 (FIG. 4) an image reading portion-accommodating portion (a space) 51.

Figure 2:
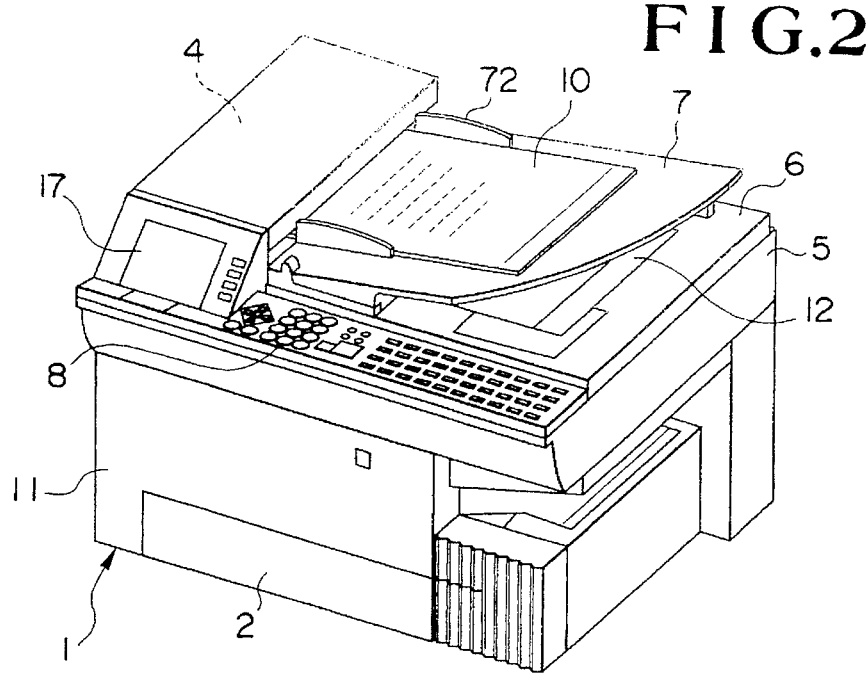
FIG. 2 is a perspective view which illustrates an appearance and shape of a facsimile apparatus according to an embodiment of the present invention in a state where the contents of a sheet-shaped document are read and transmitted.

The cover 5 has, above or on an upper surface thereof, a document paper supply device 7, a document U-turn conveyance device 4 and a document cover 6 also serving as a document paper discharge tray (FIG. 2).

Reference numeral 52 represents an image reading device accommodated in the image reading portion-accommodating portion (the space) 51 of the cover 13. The image reading device 52 comprises an image reading portion 54 including a line sensor positioned at one end (left end in FIG. 7) upon a transmission mode to read contents of the sheet-shaped document set in a document paper supply tray 71 of the document paper supply device 7 in a transmission mode and to convert the thus-read information into an electric signal and transmit by a known transmission circuit device of the facsimile apparatus. The line sensor is moved along a movement guide 53 between the foregoing end and another end (the right end) when the contents of, for example, a book-shaped document set on the document reading surface 13 of the cover 5 are read and transmitted. In order to transmit a part of information of, for example, the thick book-shaped document 11, the image reading portion (the line sensor) 54 is moved along the document reading surface 13 when the document is placed on the document reading surface 13 and when the transmission mode is selected. As a result, the image of the thick book-shaped document can be read. Reference numeral 55 represents a drive belt for moving the line sensor 54, the drive belt 55 being arranged to be driven by a motor (omitted from illustration).

The document U-turn conveyance device 4 sequentially receives the sheets of the document 10 one by one when the document 10 to be transmitted is set on the document paper supply tray 71, and then the document U-turn conveyance device 4 discharges the document sheets onto a document cover 61 disposed below the document paper supply tray 71. The document U-turn conveyance device 4 comprises a document U-turn conveyance mechanism 41 for downwards conveying the sheet-shaped document placed on the document paper supply tray 71 in the U-turn manner as designated by an arrow a in FIG. 7. This mechanism 41 is stationary mounted to an end (the left end) of the cover 5 to face the image reading portion 54. The document cover 61 has also a function as a document paper discharge tray.

Figure 3:
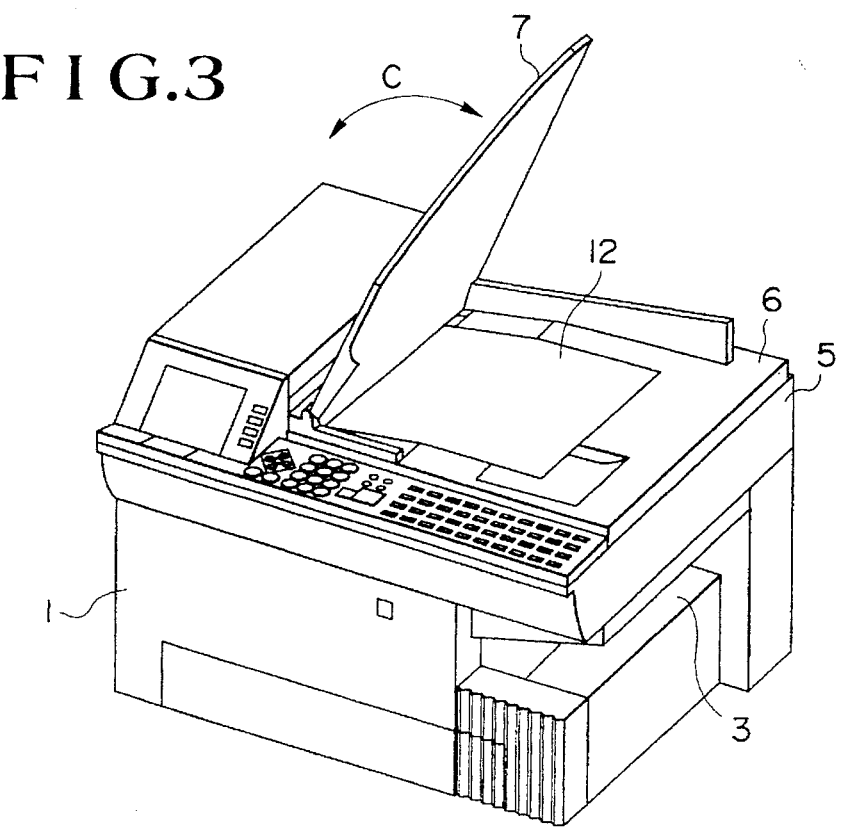
FIG. 3 is a perspective view which illustrates an appearance of the apparatus of FIG. 2 in a state where a document paper supply tray is opened.

The document paper supply device 7 comprises the document paper supply tray 71 pivotally mounted, with, for example, a hinge, to a position adjacent to a document paper supply port 42 of the document U-turn conveyance mechanism 41 so as to be opened in a direction designated by an arrow C (see also FIG. 3). The document paper supply tray 71 is arranged to receive thereon a thin document, that is, the sheet-shaped document 10 to be transmitted, the document paper supply tray 71 being disposed above the document cover 6 also serving as the document paper discharge tray. The document paper supply tray 71 is in the form of a plate having a size larger than the largest size, for example, A3-size, of the document to be transmitted. The document paper supply tray 71 is mounted in an inclined manner so as to lead the set or received document downwards to the document U-turn conveyance mechanism 41. The document paper supply tray 71 has guide 72 on either side thereof at a position adjacent to the document U-turn conveyance mechanism 41 for the purpose of guiding the document to be transmitted. The guides 72 are arranged in such a manner that their interval or distance can be adjusted according to the width of the document to be transmitted.

The document discharge-tray-and-cover 6 serving as the origin or document cover and as the document paper discharge tray is disposed on the upper surface of the document reading surface 13 of the cover 5 while being pivotally mounted to the rear end of the cover 5 through a hinge 6a to be opened/closed in a leaving/approaching direction, that is, in a direction designated by an arrow D (see FIG. 4). Although this embodiment is arranged in such a manner that the document cover and the document paper discharge tray for receiving the document discharged from the document U-turn conveyance mechanism 41 are integrated into a common unit 6, they may be made of separate bodies individually.

Thus, the document cover 61 is, as shown in FIG. 3, disposed below the document paper supply tray 71 while having a dimensions capable of covering the document reading surface 13 of the apparatus body 1 as shown in FIG. 4 so that the document 10 fed out by the document U-turn conveyance mechanism 41 is placed thereon. The document cover 61 is mounted on the top surface of the image reading portion 54 in a manner to be opened/closed by being pivoted around a hinge 6a at a rear end thereof. When (the information or contents of) the document 10 fed from the document paper supply tray 71 is transmitted, the document cover 61 is closed as shown in FIG. 2. When (the information or contents of) the thick document 11 is transmitted, the document cover 61 is opened in order to place the thick document 11 on the document reading surface 13 as shown in FIG. 4, and then it is closed to push the placed thick document 11 against the document reading surface 13. Therefore, the document cover 61 serves as a document paper discharge tray when the document 10 from the paper supply tray 71 is transmitted, and serves as a cover when the thick document 11 on the document reading surface 13 is transmitted.

The line sensor of the image reading portion 54 is, whthin the image reading portion 54, moved from a waiting position to a position below the document U-turn conveyance mechanism 41 when the document 10 on the document paper supply tray 71 is transmitted, the line sensor being arranged stationary to read the image of the document 10 at the thus-moved position. Therefore, when the document 10 has been conveyed by the document U-turn conveyance mechanism 41, the image of the document 10 is read by the line sensor. Then, the thus-read document 12 is sent onto the document cover 61 as shown in FIGS. 3 and 7. Therefore, the line sensor is selectively moved toward the document U-turn conveyance mechanism 41 or along the document reading surface 13 depending upon the selection whether the transmission is performed by using the document paper supply tray 71 or the document reading surface 13. In this case, the movement of the line sensor is performed in accordance with a command issued from a control portion when a user operates the control panel 8. However, another structure may be employed which is arranged in such a manner that the line sensor is operated in a predetermined manner in accordance with a fact that the document 10 has been set on the document paper supply tray 71 or the thick document 11 is placed on the document reading surface 13.

Further, the image reading portion 14 for recording the received image onto the cut sheet is pivotally mounted to the apparatus body 1. The image recording portion 14 is, as shown in FIGS. 5 and 7, fastened to the case cover 1b disposed on the left side of the apparatus body 1 so as to be positioned above the recording paper cassette 21 as described above, and is moved a side or escapes to the left of the apparatus body 1 upon the counterclockwise rotational mounted of the case cover 1b (see FIG. 8) after the image reading portion 54 has been moved upwards. In order to achieve this, the case cover 1b is pivotally mounted to the left side of the apparatus body 1 through a hinge 15a. When case cover 1b is rotated counterclockwise, the image recording portion 14 escapes a side to the left of the apparatus body 1. When the case cover 1b is rotated clockwise, the image recording portion 14 can be set to a predetermined position in the apparatus body 1.

The image reading portion 54 is mounted to the apparatus body 1 through the hinge 5a, 5b at the rear end of the apparatus body 1 to be rotated together with the document reading surface 13, the document U-turn conveyance mechanism 41, the document cover 61 and the document paper supply tray 71. Further, the image reading portion 54 has a spring 19 with a damper for maintaining the image reading portion 54 at a raised state when the image reading portion 54 has been rotated to be moved upwards around the hinge 5a (FIG. 5).

The operation of the apparatus will now be described.

In a reception mode, the image recording portion 14 incorporated in the apparatus body 1 records the received image onto the cut sheet serving as the recording paper. The recorded cut sheet 9 is discharged onto the recording paper discharge tray 31 through the opening portion 16a in the apparatus body 1. Since the recording paper discharge tray 31 forms a part of the case of the apparatus body 1, the outward projection from the apparatus body 1 can be prevented as compared with the conventional structure of the former type shown in FIG. 1. Since the recording paper discharge tray 31 is situated on the right-hand-side of the apparatus body 1, the user can take the recorded cut sheet 9 while having a posture facing to the front portion of the apparatus body 1. Since the recording paper cassette 21 is incorporated in the apparatus body 1 at a position to be drawn out from the front portion (side) of the apparatus body 1, the operation of supplying (or adding) the cut sheets to the cassette 21 can be performed from the front portion of the apparatus. Therefore, the necessity for the user to move to the side portion of the apparatus body 1 can be eliminated as compared with the conventional structure of the latter type. If paper jamming takes place at the time of conveying the cut sheets, all the user has to do is to rotate and raise the cover 5 (the image reading portion 54), to maintain the raised state by using the spring 19 with the damper, then and to rotate counterclockwise the case cover 1b as shown in FIG. 5 to move the image recording portion 14 to the left of the apparatus body 1 as shown in FIG. 5 so that the cut sheet having encountered paper jamming can be removed. Because the arrangement according to this embodiment is made in such a manner that the cover 5 accommodating the image reading portion 54 is mounted to the apparatus body 1 pivotally around the hinge 5a on the rear side thereof and that the image recording portion 14 is pivotally mounted through the chassis 144 to the case cover 1b forming a part of the apparatus body 1, the user can perform the following operations from the front portion (side) of the apparatus: the operation of opening the cover 5 (the operation of raising the image reading portion 54), the operation of opening the case cover 1b (the operation of moving the image recording portion 14) and the operation of removing the cut sheet having encountered paper jamming on the paper passage in the image recording portion 14 as well as the operation of supplying (adding) and changing the toner (the cosumables) in the developing unit 1421 in the image recording portion 14.

When the document 10 is transmitted, the document 10 is set on the document paper supply tray 71 as shown in FIG. 2 so that the document 10 can be introduced by the document U-turn conveyance mechanism 41 to be conveyed in the U-turn manner. During the conveyance, the image of the document 10 is read by the line sensor of the image reading portion 54, the read document 12 being then discharged onto the document cover 61.

Figure 1:
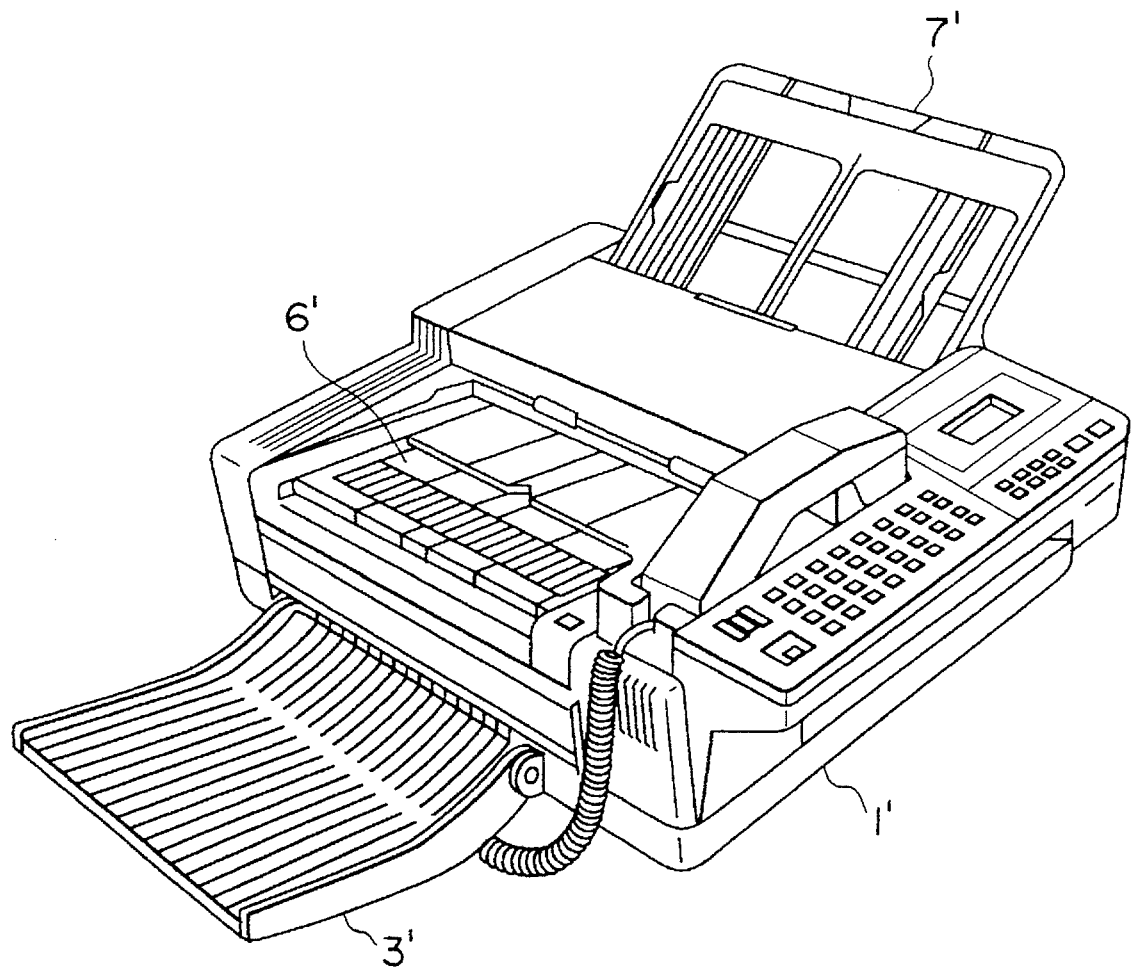
FIG. 1 is a perspective view which illustrates an appearance and shape of a conventional thermosensitive recording type of facsimile apparatus.

Since the document cover 61 serves as a tray on to which the document 10 is discharged and the document paper supply tray 71 is disposed above the cover 61, the projection of the document paper supply tray 71 from the apparatus body 1 can be prevented as compared with the conventional structure of the former type shown in FIG. 1. In addition, the document paper supply tray 71 is pivotally mounted around the left hinge above the document cover 61, the transmitted document 10 can taken out when the document paper supply tray 71 is rotated and raised as shown in FIG. 3. Therefore, setting of the document 10 to be transmitted and taking-out of the transmitted document can be performed from the front portion (side) of the apparatus.

When (information or contents of) the thick document 11 such as a book is transmitted, the document cover 61 is raised, the thick document 11 is placed on the document reading surface 13, and the thick document 11 is pressed by the document cover 61 so that the image is rear and transmitted. Since the document cover 61 is mounted to the apparatus body 1 pivotally around the hinge 6a disposed on the rear side, the operation of raising the document cover 61 can be also performed from the front portion (side) of the apparatus.

As a result, the facsimile apparatus according to this embodiment enables all operations required to recover from the paper jamming and to supply and change the consumables (the toner and so forth) to be performed by the user, i.e. operator, from the front portion (side) of the apparatus body 1 as well as the operations required to perform the transmission and reception. Therefore, the necessity for the user to move here and there can be eliminated.

Because the line sensor in the image reading portion 54 is moved, within the apparatus body 1, to the position below the document U-turn conveyance mechanism 41 to read the image of the document 10 at the moved position in the mode for transmitting the document 10, and because the line sensor is, within the apparatus body 1, moved along the document reading surface 13 to read the image of the thick document 11 in the mode of transmitting the thick document 11, one image reading portion (assembly) 54 can read both document 11 on the document reading surface 13 and the document 10 fed from the document paper supply tray 71. As a result, structure can be simplified.

Although this embodiment is arranged in such a manner that the recording paper discharge tray 31 is disposed on the right side of the apparatus body 1 and the image recording portion 14 is made pivotal on the left side of the apparatus body 1 through the case cover 1b, an inverse structure having the tray 31 on the left-hand-side and recording portion 14 on the right-hand-side may be employed to obtain a similar effect. The pivotal positional relationships among the image reading portion 54, the document cover 61 and the document paper supply tray 71 are not limited to the illustrated relationships. What is required is that the user can operate the apparatus from the front portion (side) of the apparatus body 1.

As described above, since the apparatus of the present invention is arranged in such a manner that the document paper supply tray is placed above the document cover disposed in the image reading portion on the apparatus body and the recording paper discharge tray forms a part of the apparatus body, the projections of the document paper supply tray and the recording paper discharge tray from the apparatus body can be prevented, and, the space for installing the apparatus can, therefore, be reduced. In addition, since the recording cassette can be set from the front portion (side) of the apparatus body, the supply of the cut sheets can be performed easily while eliminating the necessity for a user to move here and there. Since the line sensor in the image reading portion is shifted to be adaptable to the thin document and the thick document, one image reading portion can read both thin document and the thick document, and the structure of the image reading portion can be simplified.

Further, in the apparatus of the present invention, all operations required to recover from paper jamming and to supply and change the consumables (the toner and so forth) can be performed by the user from the front portion (side) of the apparatus body as well as the operations required to perform the transmission and reception. Therefore, the necessity for the user to move here and there around the apparatus can be eliminated, thereby improving ease and convenience of operation and management or handling.

Although the invention has been described in its preferred forms with a certain degree of particularly, it is understood that the present disclosure of the preferred forms can be changed in the details of construction and the combination and arrangement of parts may be resorted without departing from the spirit and the scope of the invention as hereinafter claimed.

We claim:

1. A facsimile apparatus comprising:

an apparatus body having an operation control portion which can be operated from a front side thereof;

a box-like cover disposed on an upper face of said apparatus body and having a document reading surface;

document reading means including an image reading portion within a space of said box-like cover capable of moving laterally in said space as to face said document reading surface, said image reading portion having a line sensor and a mechanism for moving said line sensor, said line sensor being brought to a position below a document U-turn conveyance mechanism to read, at said position, a sheet-shaped document from a document sheet supply tray when said sheet-shaped document from the tray is read to be transmitted, and being moved along said document reading surface to read a document on said document reading surface when said document on said reading surface is read to be transmitted;

cover means including a document cover so mounted to said box-like cover so as to be opened or closed and capable of covering said document reading surface;

document U-turn conveyance means disposed on one side of an upper face of said box-like cover to face said document reading means and adapted to convey a sheet-shaped document downwards and in a U-turn manner, said document U-turn conveyance means including said document U-turn conveyance mechanism which upwards conveys downwards said sheet-shaped document from said document sheet supply tray in the U-turn manner to discharge said sheet-shaped document toward said document cover;

document sheet supply means mounted to said document U-turn conveyance means and including a document sheet supply tray for supplying said sheet-shaped document to said document U-turn conveyance means;

discharged document receiving means disposed on a side opposite to said one side, on the upper face of said box-like cover adjacent to said document reading surface and including a document sheet discharge tray for receiving said sheet-shaped document discharged from said document U-turn conveyance means;

recording sheet-accommodating cassette means including a recording sheet cassette for cut sheets, said recording sheet cassette being disposed in said apparatus body in a manner to be drawn out from the front side of said apparatus body;

image recording means disposed in said apparatus body at a position above said recording sheet-accommodating cassette means, said image recording means including a cut sheet U-turn conveyance portion for conveying said cut sheets from said recording sheet cassette upwards and in the U-turn manner and an image recording portion for recording facsimile-transmitted information on said cut sheet conveyed in the U-turn manner; and discharged recording sheet receiving means including a recording sheet discharge tray disposed above said recording sheet-accommodating cassette means to face said image recording means and adapted to receive said recording sheet discharged from said cut sheet U-turn conveyance portion of said image recording means.

2. A facsimile apparatus according to claim 1, wherein said document discharge tray also serves as said document cover.

3. A facsimile apparatus comprising:

an apparatus body having an operation control portion which can be operated from a front side thereof;

a box-like cover pivotally mounted to a rear end of said apparatus body so as to be opened or closed in a vertical direction and having a document reading surface;

document reading means accommodated in a space of said box-like cover and including an image reading portion capable of moving laterally in said space to face said document reading surface, said image reading portion having a line sensor and a mechanism for moving said line sensor, said line sensor being brought to a position below a document U-turn conveyance mechanism to read, at said position, a sheet-shaped document from a document sheet supply tray when said sheet-shaped document from the tray is read to be transmitted, and being moved along said document reading surface to read said document on said document reading surface when a document is read to be transmitted;

document cover means pivotally mounted to a rear end of said box-like cover to be opened or closed vertically and to be capable of covering said document reading surface;

document U-turn conveyance means disposed on one side of an upper face of said box-like cover to face said document reading portion and adapted to convey the sheet-shaped document downwards and in a U-turn manner, said document U-turn conveyance means including said document U-turn conveyance mechanism which conveys said sheet-shaped document from said document sheet supply tray in the U-turn manner to discharge said sheet-shaped document toward said document cover;

document sheet supply means pivotally mounted to said document U-turn conveyance mechanism to be opened or closed in a direction perpendicular to a direction in which said box-like cover is opened or closed and including a document sheet supply tray for supplying said sheet-shaped document to said document U-turn conveyance mechanism;

discharged document receiving means disposed on a side opposite to said one side, on the upper face of said box-like cover adjacent to said document reading surface and including a document sheet discharge tray for receiving said sheet-shaped document discharged from said document U-turn conveyance mechanism;

recording sheet-accommodating cassette means including a recording sheet cassette for cut sheets, said recording sheet cassette being accommodated in a case of said apparatus body in a manner to be drawn out from the front side of said apparatus body;

image recording means mounted to an inside of a case cover constituting a part of said case of said apparatus body, said case cover being pivotal at one side of said case, said image recording means including a cut sheet U-turn conveyance portion for conveying said cut sheets from said recording sheet cassette, upwards and in the U-turn manner and an image recording portion for recording facsimile-transmitted information on said cut sheet conveyed in the U-turn manner, and said image recording portion being adapted to be rotated together with said case cover to be exposed to an outside of said apparatus body when said case cover is opened; and discharged recording sheet receiving means in said case of said apparatus body and including a recording sheet discharge tray disposed at a position above said recording sheet-accommodating cassette to face said cut sheet U-turn conveyance portion of said image recording portion and adapted to receive said recording sheet discharged from said cut sheet U-turn conveyance portion of said image recording means.

4. A facsimile apparatus according to claim 3, wherein said document discharge tray also serves as said document cover.

5. A facsimile apparatus comprising:

an apparatus body having an operation control portion which can be operated from a front side thereof;

a box-like cover pivotally mounted to a rear end of said apparatus body so as to be opened or closed in a vertical direction and having a document reading surface;

document reading means disposed in a space of said box-like cover and including an image reading portion capable of moving laterally to face said document reading surface;

document cover for covering said document reading surface of said box-like cover;

document U-turn conveyance means disposed on one side of an upper face of said box-like cover to convey a sheet-shaped document downwards and in a U-turn manner;

document sheet supply tray pivotally mounted to said document U-turn conveyance means to be opened or closed in a direction perpendicular to a direction in which said cover is opened or closed and adapted to supply said sheet-shaped document to said document U-turn conveyance means; and document discharge tray disposed on a side, opposite to said one side of the upper face of said box-like cover adjacent to said document reading surface and adapted to receive said sheet-shaped document discharged from said document U-turn conveyance means, wherein said apparatus body accommodates therein a cut sheet-accommodating recording sheet cassette incorporated to be drawn out from the front side of said apparatus body, image recording means disposed above said recording sheet cassette and a discharged recording sheet receiving means for receiving recorded cut sheets discharged from said image recording means, said image recording means includes a cut sheet U-turn conveyance portion for conveying said cut sheets from said recording sheet cassette upwards and in the U-turn manner and an image recording portion for recording facsimile-transmitted information on said cut sheet conveyed in the U-turn manner, said document U-turn conveyance means includes a document U-turn conveyance mechanism for conveying said sheet-shaped document from said document sheet supply tray downwards and in the U-turn manner to discharge said sheet-shaped document to said document discharge tray, said image reading means includes a line sensor and a mechanism for moving said line sensor, said line sensor being positioned below said document U-turn conveyance means when a document from said document sheet supply tray is read to be transmitted, and being moved along said document reading surface to read said document on said reading surface when said document on said document reading surface is read to be transmitted, and said discharged recording sheet receiving means includes a recording sheet discharge tray disposed above said recording sheet cassette to face said image recording portion to receive said recording sheet discharged from said cut sheet U-turn conveyance portion of said image recording portion.

6. A facsimile apparatus according to any one of claim 5, wherein said document discharge tray also serves as said document cover.

7. A facsimile apparatus comprising an apparatus body having an operation control panel in a front side thereof, wherein said facsimile apparatus includes a recording sheet cassette in said apparatus body accomodating herein cut sheets and being capable of being drawn out from the front side of said apparatus body, an image recording portion positioned above said recording sheet cassette, and adapted to record a received image on said cut sheet, a recording sheet discharge tray forming a part of said apparatus body at one side of said apparatus body and adapted to receive thereon said recorded cut sheets, an image reading portion mounted to an upper portion of said apparatus body and adapted to read the image of a document to be transmitted, a document supply tray on said image reading portion capable of receiving thereon a stack of said document sheets, a document U-turn conveyance mechanism for sequentially receiving said document to convey said document, and a document cover above which said document sheet supply tray is placed, on which said document conveyed by said document U-turn conveyance mechanism is placed and which also serves as a document discharge tray for pressing a thick document placed on said image reading surface, and, wherein said image reading portion has a line sensor which is moved to a position below said document U-turn conveyance mechanism to read said document from said tray at said position when said document from said document sheet supply tray is read to be transmitted, and which is moved along said document reading surface to read said thick document when said thick document placed on said document reading surface is read to be transmitted.

8. A facsimile apparatus comprising an apparatus body having an operation control panel in a front side thereof, wherein said facsimile apparatus includes a recording sheet cassette in said apparatus body accomodating therein cut sheets and being capable of being drawn out from the front side of said apparatus body, an image recording portion, positioned above said recording sheet cassette, and adapted to records a received image on said cut sheet, a recording sheet discharge tray forming a part of said apparatus body at one side of said apparatus body and adapted to receive thereon said recorded out sheets, an image reading portion mounted to an upper portion of said apparatus body and adapted to read the image of a document to be transmitted, a document sheet supply tray on said image reading potion capable of receiving thereon a stack of said document sheets a document U-turn conveyance mechanism for sequentially receiving and conveying said document, and a document cover above which a document sheet supply tray is mounted, on which said document conveyed by said document U-turn conveyance mechanism is placed and which also serving as a document discharge tray for pressing a thick document placed on said image reading surface, wherein said image reading portion has a line sensor which is moved to a position below said document U-turn conveyance mechanism to read said document from said tray said position when said document from said document sheet supply tray is read to be transmitted, and which is moved along said document reading surface to read said thick document when said thick document placed on said document reading surface is read to be transmitted, and wherein said image reading portion is pivotally mounted with respect to said apparatus body through a hinge at a side end different from the front side, said image recording portion is pivotally mounted through a hinge to an end of a side of said apparatus body opposite said one side for said recording sheet discharge tray, said document cover pivotally mounted with respect to said image reading portion through a hinge at an end of said apparatus body different from the front sode and said document sheet supply tray is pivotally mounted with respect to said document cover through a hinge at an end side different from the front side of said apparatus body.

* * * * *